United States Patent [19]

VanBreemen et al.

[11] Patent Number: 4,556,913

[45] Date of Patent: Dec. 3, 1985

[54] APPARATUS FOR PREVENTING VIRTUAL IMAGES IN PROJECTION TELEVISION RECEIVERS

[75] Inventors: Bertram VanBreemen, Indianapolis; William L. Wilson, Shelbyville; Duane L. Roberts; Tom W. Branton, both of Indianapolis, all of Ind.

[73] Assignee: RCA Corporation, Princeton, N.J.

[21] Appl. No.: 570,329

[22] Filed: Jan. 13, 1984

[51] Int. Cl.⁴ .......................... H04N 5/74; H04N 9/31
[52] U.S. Cl. ...................................... 358/237; 358/60; 352/104; 352/242
[58] Field of Search ..................... 358/237, 60; 353/74, 353/75; 352/104, 242

[56] References Cited

U.S. PATENT DOCUMENTS 4,358,792 11/1982 Domoleczny et al. ............. 358/254
4,360,836 11/1982 Breck et al. .......................... 358/245
4,385,316 5/1983 Yanagisawa ......................... 358/237

Primary Examiner—John C. Martin
Assistant Examiner—Anne Toth
Attorney, Agent, or Firm—Paul J. Rasmussen; Joseph Laks; Scott J. Stevens

[57] ABSTRACT

A rear projection television receiver has an image source, first and second mirrors, and a screen. Light travels from the image source to the screen along a first light path via the first and second mirrors and along a second path that bypasses the mirrors. A light baffle assembly comprising a plurality of elongated baffle elements is located in both the first and second light paths. The angle of the individual baffle elements is adjusted so that light rays are unaffected along the first light path and substantially completely blocked along the second light path.

11 Claims, 4 Drawing Figures

APPARATUS FOR PREVENTING VIRTUAL IMAGES IN PROJECTION TELEVISION RECEIVERS

This invention relates to projection television receivers, and in particular, to optical systems for rear projection receivers.

In a rear projection television receiver, an image formed on the face of a small cathode ray tube is projected via a lens assembly onto the back of a large translucent screen. The screen acts to refocus the image from this image source so that it is viewable from a location in front of the screen. In order to provide the desired magnification of the image on the screen, a long optical path length is needed. Because it is desirable to maintain the overall size of the projection receiver cabinet as small as possible, the optical path length is folded by the use of mirrors. A common rear projection arrangement utilizes two mirrors which act to define the optical or light path from the cathode ray tube or tubes to the screen. Although the desired optical path from the cathode ray tube to the screen includes the previously described mirrors, some light from the image source may reach the screen directly along stray or "sneak" paths. This stray light is undesirable for a number of reasons. Virtual images of the front surface of the lens assembly may be formed on the screen. In particular, areas of red, blue and green color will appear, produced by the typical red, blue and green image-producing cathode ray tubes. Undesired stray light reaching the screen may also reduce the contrast of the desired image, thereby degrading the quality of the picture seen by a viewer.

One solution to this problem is the use of a baffle or hood assembly attached to the lens structure mounted to the front of the cathode ray tubes. In order to prevent stray light from reaching all points of the screen, however, the hood or baffles must be positioned in such a manner that a portion of the desired optical path is also occluded. This may reduce the total amount of light that will reach the screen by as much as 25% which will therefore reduce the brightness of the viewable image. This is obviously undesirable, particularly in view of the fact that increasing brightness is an important factor in the design of new projection television receivers.

It is therefore desirable to provide a means which can be used with rear projection television receivers that will eliminate stray light from reaching the screen without reducing the brightness of the desired projected image.

In accordance with an aspect of the present invention, in a rear projection television receiver having an image source, first and second mirrors, and a screen in which light from the image source follows a first light path to the screen that incorporates the first and second mirrors, and which follows a second light path to the screen that bypasses the first and second mirrors, means for occluding the second light path comprises light baffle means disposed within the first light path after the first mirror and before the second mirror. The light baffle means is also disposed within the second light path and appears substantially transparent along the first light path and substantially opaque along the second light path.

In the accompanying drawing.

Figure 1:
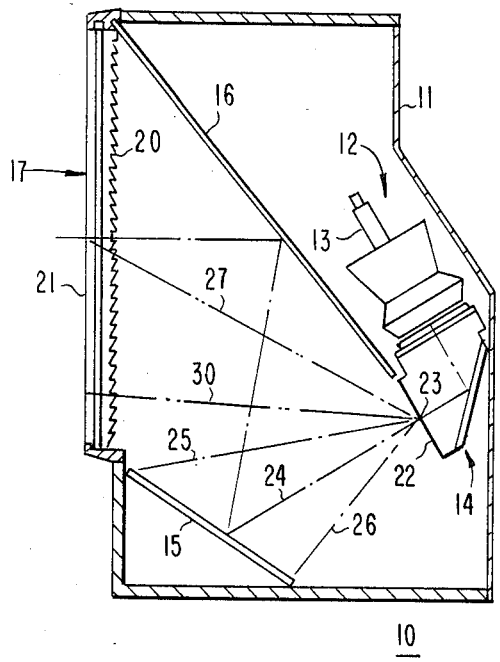
FIG. 1 is a side elevational view of a rear projection television receiver illustrating various optical light paths.

Referring to FIG. 1, there is shown a rear projection television receiver 10 comprising a cabinet 11, an image source 12 incorporating a cathode ray tube 13 and a lens assembly 14. The projection receiver 10 also comprises a first mirror 15, a second mirror 16 and a screen 17. Screen 17 may be made up of several screen elements such as a fresnel lens element 20 and a focusing lens element 21. Fresnel lens element 20 operates as a field lens and focusing lens element 21 forms a focused viewable image on the front surface of the screen 17.

Cathode ray tube 13 of image source 12 produces an image which is magnified by lens assembly 14. In a typical projection television receiver, three image sources will be provided, each providing a monochrome image, for example, red, green or blue. The light emanating from each point on the lens surface 22 of lens assembly 14 will follow an infinite number of optical or light paths, several of which are shown in FIG. 1. From a point 23 on the lens surface 22, light may reach screen 17 via a first light path 24 which incorporates the first mirror 15 and the second mirror 16. For each point on the surface 22 of lens assembly 14, the desired light path to screen 17 will also be via mirrors 15 and 16. For point 23, paths 25 and 26 form the upper and lower boundaries, respectively, of light paths that will incorporate first mirror 15. In order to provide as much image brightness on screen 17 as possible, it is desirable that as much light as possible from image source 12 be allowed to fall within the boundaries determined by paths 25 and 26.

Some light produced by image source 12 will emanate, for example, from point 23 on lens surface 22, at angles outside the region established by boundary paths 25 and 26. For example, stray light may reach screen 17 via stray paths 27 and 30, as shown in FIG. 1. This stray light may cause undesirable colored highlights to be formed on screen 17 and may also reduce the contrast of the desired images on screen 17.

Figure 2:
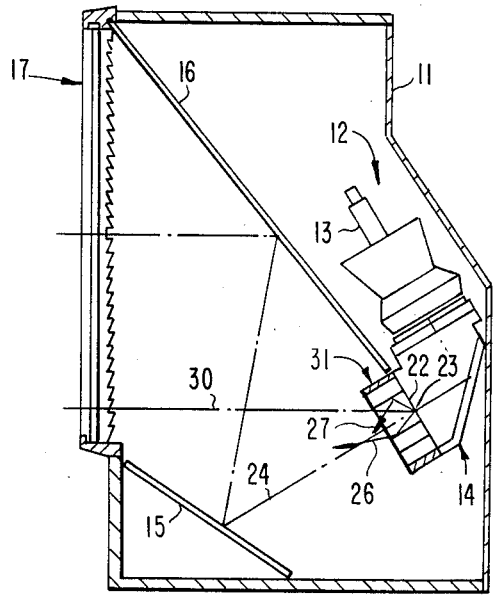
FIG. 2 is a side elevational view of a rear projection television receiver incorporating one form of light blocking means.

FIG. 2 illustratively shows one means for reducing the amount of stray light from image source 12 that reaches screen 17. An arrangement of light blocking baffles 31 is mounted to the front of lens assembly 14. As can be illustratively seen in FIG. 2, baffle assembly 31 acts to block light emanating from point 23 along light path 27. It can also be seen that light emanating along light path 24 reaches screen 17 substantially unaffected by baffle assembly 31. However, baffle assembly 31 is not effective at blocking light along stray light path 30, and therefore some stray light will reach screen 17, producing undesired images or highlights. Additionally, light emanating from point 23 along light path 26 is undesirably blocked by baffle assembly 31, thereby reducing the amount of light that reaches screen 17. Construction and placement of a baffle assembly such as is shown in FIG. 2 in a manner that would block substantially all stray light from receiving screen 17 will also significantly reduce the amount of desirable light which reaches screen 17 via mirrors 15 and 16.

Figure 3:
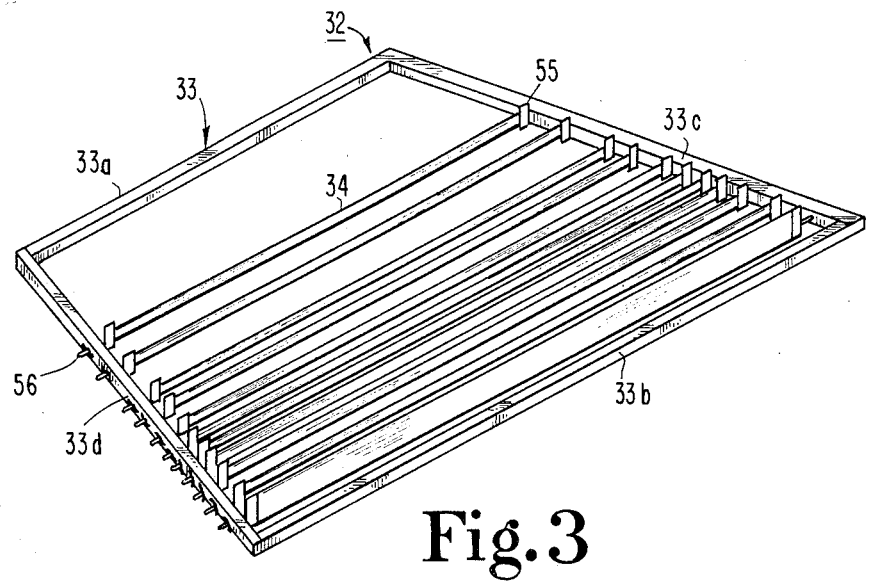
FIG. 3 is an isometric view of a light baffle means constructed in accordance with one aspect of the present invention.

In accordance with an aspect of the present invention, FIG. 3 illustrates a baffle assembly 32 comprising a trapezoidal frame 33 having sides 33a, 33b, 33c and 33d. A plurality of baffle elements 34 are disposed between sides 33c and 33d and extend parallel to sides 33a and 33b. Each of the baffle elements 34 comprise a thin elongated element which may illustratively be constructed of paper, fabric, plastic or metal; other materials may also be used.

Figure 4:
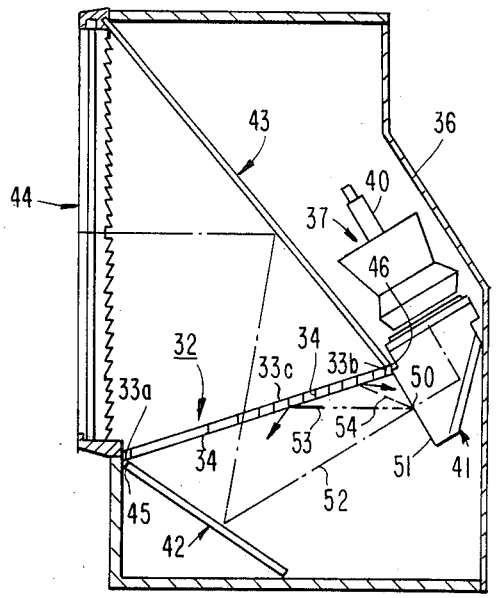
FIG. 4 is a side elevational view of a rear projection television receiver incorporating a light baffle means such as that shown in FIG. 3.

Referring to FIG. 4, baffle assembly 32 is shown in position within rear projection television receiver 35. Cabinet 36 of receiver 35 houses an image source 37 comprising a cathode ray tube 40 and a lens assembly 41. Also housed within cabinet 36 is a first mirror 42, a second mirror 43, and a screen 44. As can be seen in FIG. 4, the side 33a of frame 33 of baffle assembly 32 is positioned to be adjacent the upper edge 45 of first mirror 42. Side 33b of frame 33 is positioned to be adjacent the lower edge 46 of second mirror 43. Positioning baffle assembly 32 in this manner causes baffle assembly 32 to be located within all of the possible light paths between image source 37 and screen 44. Each of the elongated baffle elements 34 are positioned at a predetermined angle with respect to frame 33, so that the baffle elements 34 present a very low aspect ratio to light emanating along desired light paths and a high aspect ratio to light emanating along undesired or stray light paths. For example, in FIG. 4, from a point 50 on lens surface 51 of lens assembly 41, light emanates along a desired light path 52 to screen 44 via first mirror 42 and second mirror 43. Undesired light paths 53 and 54 to screen 44 are shown, which bypass mirrors 42 and 43. It can be seen in FIG. 4 that the individual baffle elements 34 are disposed at such an angle with respect to light path 52 that light along light path 52 is substantially unaffected by baffle elements 34. The baffle elements 34 are positioned with respect to the stray light paths, also, so that stray light along light paths 53 and 54 is substantially completely blocked by baffle elements 34. Baffle assembly 32 therefore will appear substantially transparent to light along light path 52, and substantially opaque to light along light paths 53 and 54. The individual baffle elements 34 are made to be light absorbing to prevent light from being reflected from elements 34. For example, elements 34 may be painted flat black.

Each of the baffle elements 34 may be positioned at a different angle with respect to frame 33 in order to minimize their effect on the overall light reflected by mirror 42 and to maximize their effect for blocking light along any undesired light paths. As illustratively shown in FIG. 3, the individual baffle elements 34 are shown as being held at each end by a sandwich type or U-shaped bracket 55 to which a screw is mounted. The screw extends through sides 33c and 33d of frame 33. A fastening element such as wing nut 56 is mounted on the screw and may be loosened to allow angular positioning of elements 34 and then tightened to hold elements 34 in place. Other mounting and adjustment means are, of course, possible, and for a given projection receiver construction, it may be possible to provide a baffle assembly having baffle elements fixed in place at optimum angular positions.

By positioning baffle assembly 32 in FIG. 4 at the upper edge 45 of mirror 42 and the lower edge 46 of mirror 43, baffle assembly 32 will therefore be positioned above any desired light path from image source 37 and mirror 42 and below any desired light path from mirror 43 to screen 44. Baffle assembly 32 will therefore block substantially all of the light emanating along undesired light paths, while reducing only a small amount, approximately 2%–3%, of the light which is desired to reach screen 44. Additionally, by reducing the amount of stray light which reaches screen 44, baffle assembly 32 will improve the apparent contrast of the image formed on screen 44 and will therefore act to improve picture quality.

What is claimed is:

1. In a rear projection television receiver having an image source, first and second mirrors, and a screen, in which light from said image source follows a first light path to said screen that incorporates said first and second mirrors and which follows a second light path to said screen that bypasses said first and second mirrors, means for occluding said second light path comprising light baffle means disposed within said first light path after said first mirror and before said second mirror and disposed within said second light path, said light baffle means appearing substantially transparent along said first light path and appearing substantially opaque along said second light path.

2. The arrangement defined in claim 1, wherein said light baffle means comprises a plurality of elongated baffle elements, each of said baffle elements disposed at a predetermined angle with respect to said first light path.

3. The arrangement defined in claim 2, wherein said elongated baffle elements are made of paper.

4. The arrangement defined in claim 2, wherein said elongated baffle elements are made of metal.

5. The arrangement defined in claim 2, wherein said elongated baffle elements are made of plastic.

6. The arrangement defined in claim 2, wherein said elongated baffle elements absorb substantially all light that impinges thereon.

7. In a rear projection television receiver having an image source, first and second mirrors, and a screen, in which light from said image source follows a first light path to said screen that incorporates said first and second mirrors and which follows a second light path to said screen that bypasses said first and second mirrors, means for occluding said second light path comprising light baffle means disposed within said first light path after said first mirror and before said second mirror and disposed within said second light path, said light baffle means presenting a low aspect ratio to light along said first light path and presenting a high aspect ratio to light along said second light path.

8. In a rear projection television receiver having an image source, a first mirror, a second mirror disposed above said first mirror, and a screen, in which light rays from said image source follow a first light path to said screen via said first and second mirrors, respectively, and which follow a second light path to said screen that bypasses said first and second mirrors, means for occluding said second light path comprising light baffle means disposed within said first light path and disposed within said second light path, said light baffle means disposed above substantially all of the light rays between said image source and said first mirror and disposed below substantially all of the light rays between said second mirror and said screen.

9. A rear projection television receiver, comprising:
an image source;
a first mirror;
a second mirror disposed above said first mirror;

a screen; and light baffle means comprising:
- a quadrilateral frame having a first side of said frame disposed adjacent to the upper edge of said first mirror and having a second side opposite said first side disposed adjacent to the lower edge of said second mirror; and
- a plurality of elongated baffle elements disposed within said frame and extending substantially parallel to said first and second sides of said frame, each of said elongated baffle elements being disposed at a predetermined angle with respect to said frame.

10. In a rear projection television receiver having an image source, first and second mirrors, and a screen, in which light from said image source follows a first light path to said screen that incorporates said first and second mirrors and which follows a second light path to said screen that bypasses said first and second mirrors, means for occluding said second light path comprising a plurality of light baffle means disposed within said first light path and disposed within said second light path, said light baffle means presenting a low aspect ratio to light along said first light path and presenting a high aspect ratio to light along said second light path.

11. A rear projection television receiver, comprising:
an image source comprising a cathode ray tube and a lens assembly;
a first mirror;
a second mirror disposed above said first mirror;
a screen; and
light baffle means comprising:
- a frame disposed adjacent to said image source; and
- a plurality of substantially parallel elongated baffle elements disposed within said frame, each of said elongated baffle elements being disposed at a predetermined angle with respect to said image source.

* * * * *